United States Patent [19]

Paul et al.

[11] Patent Number: 5,270,297
[45] Date of Patent: Dec. 14, 1993

[54] ENDURANCE AND REHYDRATION COMPOSITION

[75] Inventors: Stephen M. Paul, San Clemente, Calif.; DeWayne H. Ashmead, Fruit Heights, Utah

[73] Assignee: Metagenics, Inc., San Clemente, Calif.

[21] Appl. No.: 919,355

[22] Filed: Jul. 23, 1992

[51] Int. Cl.$^5$ .................. A23L 3/08; A61K 31/70
[52] U.S. Cl. ........................ 514/23; 426/810
[58] Field of Search ............... 514/23; 426/810

[56] References Cited

U.S. PATENT DOCUMENTS

| | | | |
|---|---|---|---|
| 456,903 | 7/1891 | Ordway | 426/810 |
| 3,821,432 | 6/1974 | Mohammed | 426/810 |
| 4,599,152 | 7/1986 | Ashmead | 204/72 |
| 4,725,427 | 2/1988 | Ashmead et al. | 426/591 |
| 4,759,940 | 7/1988 | Cattaneo et al. | 426/810 |
| 4,774,089 | 9/1988 | Ashmead | 514/499 |
| 4,830,716 | 5/1989 | Ashmead | 204/72 |
| 4,863,898 | 9/1989 | Ashmead et al. | 514/893 |
| 4,900,566 | 2/1990 | Howard | 426/810 |
| 4,961,937 | 10/1990 | Rudel | 426/554 |

*Primary Examiner*—Ronald W. Griffin
*Attorney, Agent, or Firm*—Thorpe, North & Western

[57] ABSTRACT

A composition which provides for rehydration and endurance in persons having symptoms of physiological stress comprises a blend of simple sugars and more complex carbohydrates and, at least magnesium, in the form of an amino acid chelate. Preferably the carbohydrate source is a blend of crystalline fructose and glucose polymers in a weight ratio of between about 4:1 and 1:4. Other ingredients, including anabolic nutrients, vitamins, electrolyte ions (e.g. potassium, sodium, chloride), and other minerals, such as calcium amino acid chelate, may be added as desired to provide an optimal rehydration and endurance formulation. When administered, the carbohydrate blend and amino acid chelates facilitate rehydration and the delivery of nutrients and calorie energy to appropriate sites within the body for efficient utilization.

25 Claims, No Drawings

ENDURANCE AND REHYDRATION COMPOSITION

FIELD OF THE INVENTION

The present invention relates generally to dietary supplements, and more particularly to an endurance and rehydration composition comprising glucose polymers, crystalline fructose and bioavailable minerals for use as a nutritional supplement.

BACKGROUND OF THE INVENTION

It is well known that both negative energy balance and muscle catabolism are consequences of physiological stress that often accompanies protein calorie malnutrition, strenuous physical exercise, physical trauma, burn injury, surgical trauma, malnutrition, maldigestion, malabsorption, hyperthyroidism, chemotherapy, radiation therapy, anorexia, cachexia, short bowel syndrome, old age and sepsis. It is also known that maintaining a positive metabolic energy balance can help to alleviate such problems and also has a sparing effect on muscle catabolism that occurs during strenuous physical exertion causing fatigue.

In order to properly combat the above symptoms it is essential that appropriate amounts of nutrients be available to supplant those which are utilized. For example, during periods of physiological stress, the body may burn large amounts of energy and may also be depleted of body fluids and minerals. Proper food energy (available calories), hydration and mineral bioavailability are essential to enable the body to maintain a proper balance in both intracellular and extracellular fluids and to also maintain proper enzymatic functioning, pH balance, osmotic pressure and the like. Therefore, in order to promote endurance and accomplish rehydration it is necessary, in addition to water, to provide a sustained source of energy and also a source of minerals which can be directed to proper cellular and/or tissue sites in the course of the rehydration process.

Currently, many types of endurance and rehydration formulas are marketed which are generally made up of different carbohydrates including corn syrup, high fructose corn syrup, sucrose, fructose and maltodextrin. Additionally, many of these prior art formulas contain relatively insignificant quantities of magnesium and are generally high in sodium chloride content. Though these formulas are generally suitable as nutritional supplements, they possess certain inherent deficiencies which detract from their overall utility. In this respect, these formulas typically do not contain a carbohydrate balance between readily assimilated simple sugars, for immediate utilization for energy and rehydration, and more complex carbohydrates for sustained endurance over a period of time. Moreover, these formulas do not contain appropriate bioavailable forms of minerals for intestinal absorption and transport for utilization as electrolytes, enzyme cofactors, and the like. Additionally, though many prior art formulas contain electrolytes, the electrolytes are not ratio proportioned so as to mimic the levels found in metabolically active cells. Further, the prior art formulas do not contain physiological significant levels of magnesium in bioavailable form. Further, most of these formulas do not contain anabolic nutrients such as vanadyl sulfate, alphaketoglutarate, and inosine. Though magnesium is essential to maximum endurance and many athletes are magnesium deficient, potent levels of magnesium are not included in the prior art formulas since such levels are in a form not readily assimilated by the body and usually cause diarrhea or other gastrointestinal disorders. The present invention overcomes these and other deficiencies associated with prior art endurance and rehydration formulas.

It would therefore be beneficial to provide a formula or composition which contained a optimal balance of carbohydrates, bioavailable minerals and, optionally, specific anabolic nutrients. Importantly, the inclusion of sufficient levels of magnesium in bioavailable form without producing the aforementioned undesirable side effects would be of great advantage.

OBJECTS AND SUMMARY OF THE INVENTION

It is therefore an object of the present invention to provide an endurance and rehydration composition for use as a nutritional supplement which will promote rehydration in a human being (or other warm blooded animal) and sustain endurance.

It is also an object of this invention to provide a composition which, when ingested, will maintain and/or enhance hydration and/or endurance in the subject even though symptoms of physiological stress may not be evident.

A still further object of the invention is to provide a method for facilitating rehydration and promoting endurance by use of a composition containing an optimal blend of carbohydrates containing minerals, including magnesium, in a form which the body recognizes and easily assimilates.

Another object of the invention is to provide a method and composition for facilitating rehydration and promoting endurance containing, in addition to a blend of carbohydrates and minerals, additional anabolic nutrients along with desired amounts of other vitamins and/or minerals.

These and other objects may be realized by providing a composition containing a blend of simple sugars and more complex carbohydrates and, at least magnesium, in the form of an amino acid chelate. Other ingredients, including anabolic nutrients, vitamins, electrolyte ions (e.g. potassium, sodium, chloride), and other minerals, calcium for example, (also present as amino acid chelates) may be added as desired to provide an optimal rehydration and endurance formulation.

DETAILED DESCRIPTION OF THE INVENTION AND THE PREFERRED EMBODIMENTS

The following discussion is included for purposes of describing the present invention and illustrating a preferred embodiment thereof and is not intended to be limited in scope of the specific formulas or compositions disclosed. As previously stated, the present invention comprises a composition for use as a nutritional supplement for purposes of promoting endurance and rehydration. The manner in which the formula provides these specific effects will be discussed in greater detail below.

With regard to endurance and rehydration formulations, it has been found that those which contain a blend of glucose polymers and fructose as the carbohydrates are superior to water and other types of sweetened beverages fortified with electrolytes. In this respect, glucose, fructose and electrolyte blends are generally considered to be the most desirable endurance and rehydration formulas in that they provide the fluids and minerals needed to efficiently utilize metabolic energy. The addition of readily utilizable amino acids (proteins) to the formula, when present in sufficient amounts, may also be helpful for increasing endurance. This is primarily due to the muscle sparing and energy effects of supplementary amino acids taken during exercise. As such, to be effective, endurance and rehydration formulas must generally contain properly blended fructose and glucose polymers, and electrolyte and other minerals (sodium, potassium, magnesium, calcium and chloride) which, when possible, are present as amino acid chelates.

Of the calorie sources, carbohydrates are more readily utilizable than proteins or fats to provide a source of energy, for growth and maintenance of body tissue and to regulate body processes. The provision of energy is the predominant role and must be satisfied at the expense of the other nutritive roles if there are insufficient nutrients to accomplish these functions. Carbohydrates are made up of simple sugars or monosaccharides, oligosaccharides such as di- and trisaccharides and polysaccharides. Of the simple sugars, the hexoses (glucose and fructose in particular) are the most important in energy production and in regulating body processes. When simple sugars are metabolized, energy is released. However, to be utilized as a source of energy in the body, carbohydrates must first be degraded into simple sugars. Then metabolic processes convert the simple sugars into various products such as carbon dioxide and water, or alcohols and, in the case of fermentation in muscular tissues, to lactic acid, accompanied by the release of energy. Actually, about 20 percent of simple sugar metabolism gives rise to lactic acid production. These simple sugars or monosaccharides are also utilized as raw materials for synthesis of a variety of organic compounds such as steroids, amino acids, purines, pyrimidines, complex lipids and polysaccharides. Of the various simple sugars, glucose is the most prevalent as a base source of energy. However, glucose stimulates the production of insulin which is required for proper glucose metabolism. Fructose, on the other hand, does not require insulin in order to enter certain cells of the body and therefore results in a smooth indirect flow into the bloodstream and from there to the brain and other portions of the body. Moreover, fructose also promotes a more rapid emptying of the stomach. In not delaying gastric emptying there is a reduced feeling of bloating and also a more rapid delivery of the nutrients into the small intestine for uptake into the portal blood. Both of these simple hexose sugars are readily assimilated and metabolized.

Because of the relative ease in which fructose is assimilated, coupled with the fact that it does not require insulin for metabolism, makes it the simple sugar of choice for use in the present invention. Fructose, or fruit sugar, is obtained from fruit sources or from the hydrolysis of sucrose. Sucrose, or table sugar, is a disaccharide made up of glucose and fructose and, upon hydrolysis, yields one molecule of each simple sugar. Fructose is available in various forms but high crystalline fructose is preferred.

The higher sugars and polysaccharides supply a more sustained source of energy. Most polysaccharides, e.g., starch, glycogen and dextrin, yield glucose as the end-product of complete hydrolysis and are therefore referred to as "glucose polymers" or complex carbohydrates.

Starch, which occurs abundantly in grains, tubers, and fruits is largely the source of carbohydrates for humans. Starch, corn starch in particular, is often hydrolyzed to obtain corn syrup or corn syrup solids of varying degrees of sweetness depending upon the degree or extend of hydrolysis. The "glucose polymers" used in the present invention are products of hydrolysis of corn starch which, for purposes of the present invention, may be referred to as maltodextrins and corn syrup solids. As referred to above, there are various corn syrup solids of varying degrees of sweetness depending upon the number of glucose units in the polymer chain. The shorter the chain the sweeter will be the product. The end products of hydrolysis of corn starch are the disaccharide maltose, which consists of two glucose units, and finally, glucose.

The blending of fructose with glucose polymers provides a formulation which provides a source of energy which begins to be assimilated immediately upon ingestion and continues over a sustained period of time progressing from the assimilation of fructose (and glucose if present) to the mannose and glucose polymers as they are hydrolyzed by the enzymatic processes of the body e.g., by the amylases of the saliva and pancreatic secretions, and the glucosidases and maltases in the intestine. Preferably from about 20 to 80% by weight of the carbohydrate will be made up of fructose and about 80 to 20% being glucose polymers. Optimally, the compositions will contain about 40 to 60% by weigh fructose and 60 to 40% by weight glucose polymers with a 50% fructose and 50% by weight glucose polymer blend being considered optimal.

Bioavailable forms of magnesium, calcium and other minerals, such as manganese, chromium and potassium which are properly utilized in facilitating and sustaining rehydration and endurance are those made by chelating or complexing the mineral with an amino acid or peptide ligand wherein the ligand to mineral ratio is at least 1:1 and, except for potassium, is preferably 2:1 or higher and wherein the molecular weight of the amino acid chelate formed is not greater than 1500 daltons and preferably does not exceed 1000 daltons. Such amino acid chelates are stable and are generally taught in the prior art to be absorbed intact through the intestinal tract via an active dipeptide transport system. It has not previously been known that, when properly administered, such chelates can cooperate with properly blended carbohydrates to affect rehydration and endurance. Such amino acid chelates have a stability constant of between about $10^6$ and $10^{16}$. A more detailed description of such chelates and the method by which they are absorbed through the intestine is documented in Ashmead et al., U.S. Pat. No. 4,863,898 which issued Sep. 5, 1989 and also in Ashmead et al., Intestinal Absorption of Metal Ions and Chelates, Published by Charles C. Thomas, Springfield, Illinois, 1985.

This invention, however, is not directed to metal uptake into tissues or metal transport across the intestine for absorption in the blood. Therefore, although amino acid chelates and some of the uses to which they are applicable are documented in the art, there is no teaching that proper formulations and administration of such chelates can affect rehydration and endurance when coadministered with properly formulated carbohydrates as defined above. To clarify what is meant by the term "amino acid chelate" the American Association of Feed Control Officials has issued the following official definition: "amino acid chelate—a metal ion from a soluble salt with amino acids with a mole ratio of one mole of metal to one to three (preferably two) moles of amino acids to form coordinate covalent bonds. The average weight of the hydrolyzed amino acids must be approximately 150 and the resulting molecular weight of the chelate must not exceed 800." It is also now well documented that amino acid chelates can be prepared from metal ions which do not come from soluble salts. Ashmead, U.S. Pat. No. 4,599,152 and Ashmead, U.S. Pat. No. 4,830,716 both disclose methods of preparing pure or pharmaceutical grade amino acid chelates using metal sources other than soluble metal salts. While, it is not essential to the present invention in which manner the amino chelates are made provided they meet the criteria stated above, it is preferable that the pharmaceutical grade chelates be used to minimize the presence of unwanted impurities such as sulfate ions, excess chloride and the like.

As referenced above various studies have found that minerals which are amino acid chelates made up of amino acid or combinations of amino acid and vitamin acid ligands (e.g. glycinates, arginates and nicotinate glycinates) are forms which render the minerals more readily absorbable by virtue of the fact that the transport across the intestinal mucosa and into the portal circulation is accomplished by an amino acid transport mechanism and not by traditional mineral ion transport. Once in the blood, the amino acid chelates do not bind directly to serum proteins including albumin, ceruloplasmin, transferrin and in the like, but are transported directly to target tissues in the chelated form. Thereafter, the mineral is released from the chelate intracellularly. Importantly, this direct transport results in greatly improved bioavailability of the minerals to the end organs and/cells and works independently of either mineral saturated or reduced concentrations of serum proteins. Additionally, unlike most conventional mineral salts that are commercially available, amino acid chelates do not cause changes in bowel habits after oral administration. This is in contrast to notable examples of conventional iron salts such as iron sulfate which may cause constipation and magnesium citrate which commonly causes loose stools or diarrhea.

While the amino acid or peptide ligands used in formulating the amino acid chelates are in themselves important nutrients, they may or may not be present in sufficient amounts to materially contribute as protein calorie sources in the present invention. In any event they are important factors in furthering the cause of rehydration and endurance.

In accordance with a preferred embodiment of the present invention, there is provided an endurance and rehydration composition for use as a nutritional supplement. The formulation preferably includes glucose polymers, crystalline fructose, and minerals in amino acid chelated form in optimal ratios to assure rehydration, sustained energy and optimal delivery of the minerals to various tissues and organs which are essential for enhanced stamina and endurance.

In its most fundamental form, the rehydration and endurance formulations of the present invention include a blend of glucose polymers, fructose and magnesium amino acid chelate in the following ranges:

| BASIC INGREDIENTS | RANGES in PARTS BY WEIGHT | |
|---|---|---|
| | Broad | Preferred |
| Glucose Polymers | 10–1000 | 50–500 |
| Crystalline Fructose | 10–1000 | 50–500 |
| Magnesium | $25-2500 \times (10^{-3})$ | $50-1500 \times (10^{-3})$ |
| Amino Acid Ligand | 0.15–32 | 0.3–20 | with the proviso that the Weight ratio of glucose polymer to fructose is in the range of between about 4:1 to 1:4, the mole ratio of amino acid ligand to magnesium is in the range of at least 1:1 and is preferably 2:1 and the ratio of magnesium to carbohydrate is such that the formulation will contain between 10 and 25 milligrams of magnesium, in amino acid chelated form, for each gram of glucose and fructose carbohydrate blend present.

It is also preferable that the formulation contain one or more additives selected from the group consisting of an electrolyte mixture for optimizing rehydration and a specific anabolic nutrient mixture including chromium nicotinate glycinate and vanadyl sulfate in proportions which enhance the utilization of insulin and carbohydrates, fat and protein.

Preferred formulations and ranges of these ingredients are:

| ELECTROLYTE INGREDIENTS | RANGES in PARTS BY WEIGHT |
|---|---|
| Calcium | $50-500 \times (10^{-3})$ |
| Sodium | $50-500 \times (10^{-3})$ |
| Potassium | $200-800 \times (10^{-3})$ |
| Chloride | $100-600 \times (10^{-3})$ |
| Phosphorus | $200-500 \times (10^{-3})$ |

The calcium is preferably present as an amino acid chelate having a ligand to calcium mole ratio of at least 1:1 and preferably 2:1. The sodium and potassium may be present as amino acid complexes having a ligand to metal mole ratio of 1:1 or they may be present as inorganic salts in the form of chlorides, phosphates, and the like. When properly blended into the basic formulation provided above these ingredients provide a balance of electrolytes which enhance and facilitate rehydration.

A specific anabolic nutrient mixture which enhances the utilization of insulin and carbohydrates, fat and protein includes chromium, particularly as the GTF factor chromium nicotinate glycinate, and vanadyl sulfate. One or more other optional ingredients selected from the group consisting of α-ketoglutarate, L-carnitine, inosine and manganese amino acid chelate optimize the anabolic nutrient mixture. These ingredients may be added to the base formulation, with or without the presence of the electrolyte formulation, in the following concentrations.

| ANABOLIC INGREDIENTS | RANGES in PARTS BY WEIGHT | |
|---|---|---|
| | Broad | Preferred |
| Manganese | $0-5 \times (10^{-3})$ | $1-5 \times (10^{-3})$ |
| Chromium | $50-500 \times (10^{-6})$ | $100-400 \times (10^{-6})$ |
| L-Carnitine | $0-500 \times (10^{-3})$ | $1-300 \times (10^{-3})$ |
| Vanadyl Sulfate | $50-500 \times (10^{-3})$ | $100-400 \times (10^{-3})$ |
| Alpha-Ketoglutarate | $0-200 \times (10^{-3})$ | $1-200 \times (10^{-3})$ |
| Inosine | $0-100 \times (10^{-3})$ | $1-100 \times (10^{-3})$ |

In addition to the above combinations, it may be advantageous to also add vitamins, and perhaps also other minerals, as warranted to supplement and optimize the formulations for purposes of rehydration and endurance. Suitable of the vitamins which may be added are the following.

| VITAMIN INGREDIENTS | RANGES in PARTS BY WEIGHT |
| --- | --- |
| Vitamin B2 | $5-15 \times (10^{-3})$ |
| Vitamin B3 | $10-40 \times (10^{-3})$ |
| Vitamin B1 | $2-10 \times (10^{-3})$ |
| Vitamin B5 | $25-75 \times (10^{-3})$ |
| Vitamin B6 | $5-15 \times (10^{-3})$ |
| Vitamin E(IU) | 0-75 (IU) |

The composition is preferably manufactured in powder form by agglomerating the raw material ingredients in a suitable agglomerator so as to result in a finished product having a uniform composition with the precise proportions of the components. The agglomerated material is then packaged in a suitable container. The powdered composition ma then be mixed with water for consumption although other liquid sources such as fruit juices, milk, or beverages can be substituted. If desired, the product can also be formulated in liquid form. When reconstituted in water, the carbohydrate content is not greater than 10% by weight and is generally between about 6 and 7 percent. The preferred daily dosage of the formula ranges from 20 to 414 grams based on the powdered composition. The daily dosage can be ingested in a single serving or divided into various servings and taken at intervals. Preferably, the composition will be taken prior to or following strenuous exercise or upon the notice of symptoms of physiological stress.

Other ingredients, such as flavoring agents, stabilizers, gums, coloring agents, citric acid, and the like may also be utilized to maximize flavor, tartness, compatibility and texture.

Advantageously, the present formulation optimally contains a carbohydrate balance consisting of approximately 50% (w/w) glucose polymers and 50% (w/w) crystalline fructose. The inclusion of this carbohydrate blend has the net effect of helping to maintain a positive metabolic energy balance and also has a sparing effect on muscle catabolism. The advantages attendant to these effects are significant in that both negative energy balance and muscle catabolism are consequences of physiological stress that often accompanies protein calorie malnutrition, strenuous physical exercise, physical trauma, burn injury, surgical trauma, malnutrition, maldigestion, malabsorption, hyperthyroidism, chemotherapy, radiation therapy, anorexia, cachexia, short bowel syndrome, old age and sepsis. The aforementioned ratio of the glucose polymers and crystalline fructose also helps to delay the onset of fatigue that occurs during strenuous physical exertion.

The formulation contains significantly high levels of the mineral magnesium. As is well known, strenuous physical activity, mental and physical stress can cause a decline in tissue magnesium levels as a result of hypermetabolic compensation and the increased elaboration of catecholamines, glucagon and mineral corticoids. Consequently, the present formula provides the necessary magnesium to replenish reduced magnesium levels in the body. Importantly, due to the inclusion of the magnesium as an amino acid chelate in the formula, there are no side effects of intestinal irritability, loose stools or diarrhea after ingestion of the present compositions which are typically associated with the intake of high levels of magnesium as an inorganic salt. Additionally, the high level of magnesium found in the present formula mimics intracellular mineral ratios of muscle cells to significantly increase cell metabolism and energy production during prolonged exercise.

In the preferred embodiment, the formula also contains specific anabolic nutrients including chromium nicotinate glycinate and vanadyl sulfate in proportions which enhance the utilization of insulin and carbohydrates, fat and protein. Additionally, the inclusion of the ingredient inosine in the present formula greatly enhances oxygenation of tissue.

The electrolyte ratio in the present formula mimics that which is found within metabolically active cells, and as such serves to significantly enhance cellular metabolism and biological energy production as well as removal of metabolic waste products during periods of intense physical activity or stress. In addition to the electrolyte ratios paralleling those found in muscle cells, as previously indicated, the electrolytes which can be delivered via an amino acid transport system makes them immediately available to maintain optimize cellular metabolism. Importantly, the amino acid transport system allows for high mineral delivery and does not cause adverse gastrointestinal side effects.

The present formula further contains certain B-complex vitamins that are typically depleted during prolonged exercise, periods of strenuous physical activity and other causes of physiological stress. The added source of B vitamins provided by the present formula helps to replenish such losses and further assist as coenzymes in the production of metabolic energy.

When reconstituted with the appropriate amount of water, the present formula is isotonic and as a result, will not cause any bowel irregularity, even with repeated use during relatively short period of time. Additionally, when properly reconstituted with water, the formula contains a proper concentration of carbohydrate that will not delay gastric emptying. This reduces feelings of bloating and allows for rapid delivery of the components into the small intestinal lumen for uptake by the mucosa into the portal circulation. The present formula is further isotonic pH regulated which breaks clean from the mouth with no chalky or sticky mouth feel. Additionally, the formula rapidly empties from the stomach causing no gastric discomfort and no changes in bowel habits.

EXAMPLE

The following formulae represent specific embodiments of the invention. These may be prepared in the manner indicated above by blending together the stated raw material ingredients in an agglomerator so as to result in a finished product having a uniform composition with the precise proportions of the components as indicated. The agglomerated material is then packaged in a suitable container. In the preferred embodiment, the formula comprises the following ingredients stated in amounts by weight:

| INGREDIENTS | FORMULATION NUMBER | | | | | | | |
|---|---|---|---|---|---|---|---|---|
| | I | II | III | IV | V | VI | VII | VIII |
| Glucose Polymers(g) | 36.0 | 44.0 | 80.0 | 27.0 | 50.0 | 60.0 | 55.0 | 20.0 |
| Crystalline Fructose(g) | 36.0 | 64.0 | 20.0 | 54.0 | 50.0 | 40.0 | 75.0 | 20.0 |
| Magnesium(mg) | 1160.0 | 1800.0* | 1625.0* | 1560.0 | 1500.0 | 1700.0* | 1425.0 | 400.0 |
| Amino Acid Lig | 7.5$^a$ | 18.7$^b$ | 15.3$^c$ | 19.5$^d$ | 9.4$^a$ | 18.5$^e$ | 10.7$^f$ | 2.5$^a$ |
| Calcium(mg) | 145.0 | 190.0 | 175.0 | 160.0 | — | — | 150.0 | 90.0 |
| Sodium(mg) | 220.0 | 280.0 | 150.0 | 220.0 | — | — | 230.0 | 130.0 |
| Potassium(mg) | 434.0 | 520.0 | 475.0 | 450.0 | — | — | 425.0 | 200.0 |
| Chloride(mg) | 290.0 | 425.0 | 460.0 | 340.0 | — | — | 320.0 | 170.0 |
| Phosphorus(mg) | 360.0 | 500.0 | 400.0 | 390.0 | — | — | 420.0 | 190.0 |
| Manganese(mg) | 2.4$^1$ | 2.1 | 2.5 | — | — | 2.2 | 2.4 | 1.5 |
| Chromium(μg) | 240.0$^3$ | 325.0 | 290.0$^2$ | — | — | 300.0$^2$ | 300.0$^2$ | 150.0$^2$ |
| L-Carnitine(mg) | 6.0 | 8.0 | 8.0 | — | — | 7.5 | 9.0 | 4.0 |
| Vanadyl Sulfate(mg) | 240.0 | 375.0 | 300.0 | — | — | 300.0 | 330.0 | 170.0 |
| Alpha-Ketoglutarate(mg) | 25.0 | 40.0 | 35.0 | — | — | 30.0 | 28.0 | 13.0 |
| Inosine(mg) | 60.0 | 85.0 | 80.0 | — | — | 70.0 | 75.0 | 30.0 |
| Vitamin B2(mg) | 8.0 | 12.0 | — | — | — | — | 10.0 | 6.0 |
| Vitamin B3(mg) | 25.0 | 32.0 | — | — | — | — | 30.0 | 15.0 |
| Vitamin B1(mg) | 6.0 | 8.0 | — | — | — | — | 7.0 | 3.0 |
| Vitamin B5(mg) | 54.0 | 80.0 | — | — | — | — | 75.0 | 40.0 |
| Vitamin B6(mg) | 7.0 | 10.0 | — | — | — | — | 8.0 | 4.0 |
| Vitamin E(IU) | 36.0 | 44.0 | — | — | — | — | 40.0 | 18.0 |

$^1$ = manganese arginate
$^2$ = chromium nicotinate glycinate
$^3$ = chromium glycinate
* = as a pharmaceutical grade chelate
$^a$ = glycine
$^b$ = hydrolyzed protein isolate ave m.w. 125
$^c$ = mixed amino acids ave m.w. 110
$^d$ = enzymatic hydrolyzed soy ave m.w. 150
$^e$ = hydrolyzed casein ave m.w. 130
$^f$ = mixed amino acids ave m.w. 90

The above compositions may be mixed with the proper liquid [water, fruit juice, etc.] to prepare an 8-12 liquid ounce solution having a solids content of about 20 to 414 grams as stated above.

Additional modifications and improvements of the present invention may also by apparent to those skilled in the art. Thus, the particular combination of parts described and illustrated herein is intended to represent only one embodiment of the invention, and is not intended to service limitations of alternative devices within the spirit and scope of the invention.

We claim:

1. A fructose/glucose blend composition comprising in parts by weight (a) from 10 to 1000 parts of glucose polymers; (b) from 10 to 1000 parts of fructose; (c) from 25 to 2500×(10$^{-3}$) parts magnesium; and 0.15 to 32 parts of an amino acid ligand source; with the proviso that the weight ratio of glucose polymer to fructose is in the range of between about 4:1 to 1:4, the magnesium is present as an amino acid chelate formed from said amino acid ligand source wherein the mole ratio of amino acid ligand to magnesium in said chelate is at least 1:1 and the ratio of magnesium to carbohydrate is such that the formulation contains between 10 and 25 milligrams of magnesium per gram of said glucose and fructose carbohydrate blend.

2. A composition according to claim 1 wherein said fructose is crystalline fructose and said magnesium amino acid chelate has a molecular weight which is not greater than 1500 daltons and has a stability constant of between about 10$^6$ and 10$^{16}$.

3. A composition according to claim 2 which additionally contains, in parts by weight (d) from 50 to 500×(10$^{-3}$) parts calcium; (e) from 50 to 500×(10$^{-3}$) parts sodium; (f) from 200 to 800×(10$^{-3}$) parts potassium; (g) from 100 to 600×(10$^{-3}$) parts chloride; and from 200 to 500×(10$^{-3}$) parts phosphorus with the proviso that the calcium is present as an amino acid chelate having a ligand to calcium mole ratio of at least 1:1.

4. A composition according to claim 2 which additionally contains, in parts by weight (h) from 0 to 5×(10$^{-3}$) parts manganese; (i) from 50 to 500×(10$^{-6}$) parts chromium (j) from 0 to 500×(10$^{-3}$) parts L-carnitine; (k) from 50 to 500×(10$^{-3}$) parts vanadyl sulfate; (l) from 0 to 200×(10$^{-3}$) parts α-ketoglutarate; and (m) from 0 to 100×(10$^{-3}$) parts inosine with the proviso that the manganese when present is an amino acid chelate having a ligand to metal mole ratio of at least 1:1 and the chromium is present as a member selected from the group consisting of an amino acid chelate and a chromium nicotinate glycinate and mixtures thereof.

5. A composition according to claim 3 which additionally contains, in parts by weight (h) from 0 to 5×(10$^{-3}$) parts manganese; (i) from 50 to 500×(10$^{-6}$) parts chromium (j) from 0 to 500×(10$^{-3}$) parts L-carnitine; (k) from 50 to 500×(10$^{-3}$) parts vanadyl sulfate; (l) from 0 to 200×(10$^{-3}$) parts α-ketoglutarate; and (m) from 0 to 100×(10$^{-3}$) parts inosine with the proviso that the manganese when present is an amino acid chelate having a ligand to metal mole ratio of at least 1:1 and the chromium is present as a member selected from the group consisting of an amino acid chelate and a chromium nicotinate glycinate and mixtures thereof.

6. A composition according to claim 5 which contains in parts by weight (h) from 1 to 5×(10$^{-3}$) parts manganese; (i) from 100 to 400×(10$^{-6}$) parts chromium (j) from 1 to 300×(10$^{-3}$) parts L-carnitine; (k) from 100 to 400×(10$^{-3}$) parts vanadyl sulfate; (l) from 1 to 200×(10$^{-3}$) parts α-ketoglutarate; and (m) from 1 to 100×(10$^{-3}$) parts inosine.

7. A composition according to claim 2 which contains in parts by weight (n) from 5 to 15×(10$^{-3}$) parts of vitamin B$_2$; (n) from 10 to 40×(10$^{-3}$) parts vitamin B$_3$ (o) from 2 to $10\times(10^{-3})$ parts vitamin $B_1$; (p) from 25 to $75\times(10^{-3})$ parts of vitamin $B_5$; (q) from 5 to $15\times(10^{-3})$ parts vitamin $B_6$; and (m) from 0 to 75 international units of vitamin E.

8. A composition according to claim 3 which contains in parts by weight (n) from 5 to $15\times(10^{-3})$ parts of vitamin $B_2$; (n) from 10 to $40\times(10^{-3})$ parts vitamin $B_3$ (o) from 2 to $10\times(10^{-3})$ parts vitamin $B_1$; (p) from 25 to $75\times(10^{-3})$ parts of vitamin $B_5$; (q) from 5 to $15\times(10^{-3})$ parts vitamin $B_6$; and (m) from 0 to 75 international units of vitamin E.

9. A composition according to claim 4 which contains in parts by weight (n) from 5 to $15\times(10^{-3})$ parts of vitamin $B_2$; (n) from 10 to $40\times(10^{-3})$ parts vitamin $B_3$ (o) from 2 to $10\times(10^{-3})$ parts vitamin $B_1$; (p) from 25 to $75\times(10^{-3})$ parts of vitamin $B_5$; (q) from 5 to $15\times(10^{-3})$ parts vitamin $B_6$; and (m) from 0 to 75 international units of vitamin E.

10. A composition according to claim 5 which contains in parts by weight (n) from 5 to $15\times(10^{-3})$ parts of vitamin $B_2$; (n) from 10 to $40\times(10^{-3})$ parts vitamin $B_3$ (o) from 2 to $10\times(10^{-3})$ parts vitamin $B_1$; (p) from 25 to $75\times(10^{-3})$ parts of vitamin $B_5$; (q) from 5 to $15\times(10^{-3})$ parts vitamin $B_6$; and (m) from 0 to 75 international units of vitamin E.

11. A composition according to claim 2 wherein said magnesium amino acid chelate has a ligand to magnesium mole ratio of at least 2:1 and is a pharmaceutical grade chelate.

12. A composition according to claim 5 wherein said magnesium, calcium and manganese minerals are all present as amino acid chelates having a ligand to mineral mole ratio of at least 2:1 and wherein said chelates are of a pharmaceutical grade in purity.

13. A method of providing rehydration and endurance to a human having symptoms of physiological stress which comprises administering to said human an effective amount of a fructose/glucose blend composition comprising in parts by weight (a) from 10 to 1000 parts of glucose polymers; (b) from 10 to 1000 parts of fructose; (c) from 25 to $2500\times(10^{-3})$ parts magnesium; and 0.15 to 32 parts of an amino acid ligand source; With the proviso that the weight ratio of glucose polymer to fructose is in the range of between about 4:1 to 1:4, the magnesium is present as an amino acid chelate formed from said amino acid ligand source wherein the mole ratio of amino acid ligand to magnesium in said chelate is at least 1:1 and the ratio of magnesium to carbohydrate is such that the formulation contains between 10 and 25 milligrams of magnesium per gram of said glucose and fructose carbohydrate blend.

14. A method according to claim 13 which comprises administering, in a liquid form having a carbohydrate content not in excess of about 10% by weight, between about 20 and 414 grams of said composition daily.

15. A method according to claim 13 wherein said fructose is crystalline fructose and said magnesium amino acid chelate has a molecular weight which is not greater than 1500 daltons and has a stability constant of between about $10^6$ and $10^{16}$.

16. A method according to claim 15 wherein said composition additionally contains, in parts by weight (d) from 50 to $500\times(10^{-3})$ parts calcium; (e) from 50 to $500\times(10^{-3})$ parts sodium; (f) from 200 to $800\times(10^{-3})$ parts potassium; (g) from 100 to $600\times(10^{-3})$ parts chloride; and from 200 to $500\times(10^{-3})$ parts phosphorus with the proviso that the calcium is present as an amino acid chelate having a ligand to calcium mole ratio of at least 1:1.

17. A method according to claim 15 wherein said composition additionally contains, in parts by weight (h) from 0 to $5\times(10^{-3})$ parts manganese; (i) from 50 to $500\times(10^{-6})$ parts chromium (j) from 0 to $500\times(10^{-3})$ parts L-carnitine; (k) from 50 to $500\times(10^{-3})$ parts vanadyl sulfate; (l) from 0 to $200\times(10^{-3})$ parts $\alpha$-ketoglutarate; and (m) from 0 to $100\times(10^{-3})$ parts inosine with the proviso that the manganese when present is an amino acid chelate having a ligand to metal mole ratio of at least 1:1 and the chromium is present as a member selected from the group consisting of an amino acid chelate and a chromium nicotinate glycinate and mixtures thereof.

18. A method according to claim 16 wherein said composition additionally contains, in parts by weight (h) from 0 to $5\times(10^{-3})$ parts manganese; (i) from 50 to $500\times(10^{-6})$ parts chromium (j) from 0 to $500\times(10^{-3})$ parts L-carnitine; (k) from 50 to $500\times(10^{-3})$ parts vanadyl sulfate; (l) from 0 to $200\times(10^{-3})$ parts $\alpha$-ketoglutarate; and (m) from 0 to $100\times(10^{-3})$ parts inosine with the proviso that the manganese when present is an amino acid chelate having a ligand to metal mole ratio of at least 1:1 and the chromium is present as a member selected from the group consisting of an amino acid chelate and a chromium nicotinate glycinate and mixtures thereof.

19. A method according to claim 18 wherein said composition contains in parts by weight (h) from to $5\times(10^{-3})$ parts manganese; (i) from 100 to $400\times(10^{-6})$ parts chromium (j) from 1 to $300\times(10^{-3})$ parts L-carnitine; (k) from 100 to $400\times(10^{-3})$ parts vanadyl sulfate; (l) from 1 to $200\times(10^{-3})$ parts $\alpha$-ketoglutarate; and (m) from 1 to $100\times(10^{-3})$ parts inosine.

20. A method according to claim 15 wherein said composition contains in parts by weight (n) from 5 to $15\times(10^{-3})$ parts of vitamin $B_2$; (n) from 10 to $40\times(10^{-3})$ parts vitamin $B_3$ (o) from 2 to $10\times(10^{-3})$ parts vitamin $B_1$; (p) from 25 to $75\times(10^{-3})$ parts of vitamin $B_5$; (q) from 5 to $15\times(10^{-3})$ parts vitamin $B_6$; and (m) from 0 to 75 international units of vitamin E.

21. A method according to claim 16 wherein said composition contains in parts by weight (n) from 5 to $15\times(10^{-3})$ parts of vitamin $B_2$; (n) from 10 to $40\times(10^{-3})$ parts vitamin $B_3$ (o) from 2 to $10\times(10^{-3})$ parts vitamin $B_1$; (p) from 25 to $75\times(10^{-3})$ parts of vitamin $B_5$; (q) from 5 to $15\times(10^{-3})$ parts vitamin $B_6$; and (m) from 0 to 75 international units of vitamin E.

22. A method according to claim 17 wherein said composition contains in parts by weight (n) from 5 to $15\times(10^{-3})$ parts of vitamin $B_2$; (n) from 10 to $40\times(10^{-3})$ parts vitamin $B_3$ (o) from 2 to $10\times(10^{-3})$ parts vitamin $B_1$; (p) from 25 to $75\times(10^{-3})$ parts of vitamin $B_5$; (q) from 5 to $15\times(10^{-3})$ parts vitamin $B_6$; and (m) from 0 to 75 international units of vitamin E.

23. A method according to claim 18 wherein said composition contains in parts by weight (n) from 5 to $15\times(10^{-3})$ parts of vitamin $B_2$; (n) from 10 to $40\times(10^{-3})$ parts vitamin $B_3$ (o) from 2 to $10\times(10^{-3})$ parts vitamin $B_1$; (p) from 25 to $75\times(10^{-3})$ parts of vitamin $B_5$; (q) from 5 to $15\times(10^{-3})$ parts vitamin $B_6$; and (m) from 0 to 75 international units of vitamin E.

24. A method according to claim 15 wherein said magnesium amino acid chelate has a ligand to magnesium mole ratio of at least 2:1 and is a pharmaceutical grade chelate.

25. A method according to claim 16 wherein said magnesium, calcium and manganese minerals are all present as amino acid chelates having a ligand to mineral mole ratio of at least 2:1 and wherein said chelates are of a pharmaceutical grade in purity.

* * * * *

UNITED STATES PATENT AND TRADEMARK OFFICE
CERTIFICATE OF CORRECTION

PATENT NO. : 5,270,297
DATED : December 14, 1993
INVENTOR(S) : Stephen M. Paul and H. DeWayne Ashmead It is certified that error appears in the above-indentified patent and that said Letters Patent is hereby corrected as shown below:

On the title page, item [75], change "DeWayne H. Ashmead" to --H. DeWayne Ashmead--.

Signed and Sealed this

Second Day of August, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,270,297
DATED : December 14, 1993
INVENTOR(S) : Stephen M. Paul & H. DeWayne Ashmead It is certified that error appears in the above-identified patent and that said Letters Patent is hereby corrected as shown below:

On the title page item [73], Assignee: Metagenics, Inc., San Clemente, Calif., ADD --Albion International, Inc., Clearfield, Utah.--

Signed and Sealed this

Twelfth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 5,270,297
DATED : December 14, 1993
INVENTOR(S) : Stephen M. Paul and H. DeWayne Ashmead It is certified that error appears in the above-identified patent and that said Letters Patent is hereby corrected as shown below:

Title page,
Item [73], Assignee, add -- Albion International, Inc., Clearfield, Utah. --

Signed and Sealed this

Fifth Day of October, 2004

JON W. DUDAS
*Director of the United States Patent and Trademark Office*